UNITED STATES PATENT OFFICE.

CONRAD SEMPER, OF PHILADELPHIA, PENNSYLVANIA, ASSIGNOR TO HARRISON BROTHERS & CO., OF SAME PLACE.

MANUFACTURE OF SULPHATE OF ALUMINA.

SPECIFICATION forming part of Letters Patent No. 280,090, dated June 26, 1883.

Application filed January 30, 1883. (No specimens.)

*To all whom it may concern:*

Be it known that I, CONRAD SEMPER, of the city and county of Philadelphia, in the State of Pennsylvania, have invented an Improvement in the Manufacture of Sulphate of Alumina, of which the following is a description sufficient to enable those skilled in the art to which my invention appertains to fully understand and practice the same.

The object of my invention is to produce a porous sulphate of alumina containing zinc, and at the same time obtain a neutral article in which the iron is reduced in whole or part to ferrous oxide, should ferric oxide be present in the clay from which the alumina is made. I have discovered that by adding to a solution of ferruginous sulphate of alumina of such degree of concentration as that it will harden when cold, and just before it commences to thicken, a certain quantity of sulphite of zinc, I obtain a mass in which the iron, which has been present in the aluminous material as ferric oxide, is reduced to ferrous oxide, and which is at the same time interspaced with small cavities, in which cavities sulphurous-acid gas is contained. I have found that if such sulphate of alumina as is obtained by this process is employed in paper-making, it is much more readily soluble on account of its porosity than the ordinary sulphate of alumina, which is a hard homogeneous substance into which water cannot penetrate, and for that reason is very difficult of solution. Moreover, the sulphurous acid which has been inclosed in the cavities spoken of will react on any free chlorine present in the paper-pulp by reason of insufficient washing after said pulp has undergone the bleaching process.

The following is a method which I preferably employ to carry out my invention: After any of the ordinary aluminous materials suitable for the manufacture of alum have been treated with sulphuric acid, and the action has ceased upon the same, I dilute the mass with water and draw it off into a receptacle in which I allow the silica or other insoluble impurities to settle out. After these insoluble parts have been removed I take the supernatant clear solution, and if very sour I treat it in the well-known manner with oxide of zinc to neutralize the free acid therein. I then evaporate the solution until it is brought to such a strength that it will harden when cold. I then draw it off into a pan or other suitable receptacle, and just previous to its getting hard, and when it begins to thicken, I add a small quantity of sulphite of zinc, which I sprinkle over and stir up with the mass. Sulphurous acid will be generated, which will act upon the peroxide of iron, if such is present, thus reducing it to ferrous oxide. At the same time part of the sulphurous acid will be retained in the thick mass, so that it will form a perfectly-porous substance when cold.

Having thus described my invention, I claim and desire to secure by Letters Patent of the United States—

The process of manufacturing porous sulphate of alumina containing sulphite of zinc, which consists in adding sulphite of zinc to an aluminous solution made by treating an aluminous material with sulphuric acid, and from which silica has been removed, and which is of such degree of concentration as, when cold, to harden, as specified.

In testimony whereof I have hereunto signed my name this 27th day of January, A. D. 1883.

CONRAD SEMPER.

In presence of—
JOHN RODGERS,
JAMES M. WILCOX, Jr.,
WM. C. STRAWBRIDGE,
J. BONSALL TAYLOR.